United States Patent [19]

Horak

[11] Patent Number: 4,880,039

[45] Date of Patent: Nov. 14, 1989

[54] INCREASING THE ACCURACY OF LIQUID VOLUME MEASUREMENTS UTILIZING LIQUID LEVEL SENSING

[76] Inventor: Vladimir Horak, 394 Taylor Ave., Hackensack, N.J. 07601

[21] Appl. No.: 356,763

[22] Filed: May 25, 1989

[51] Int. Cl.$^4$ .............................................. B65B 1/36
[52] U.S. Cl. .......................................... 141/1; 141/83; 141/94; 141/128; 141/198; 73/290 R
[58] Field of Search ................. 141/1, 83, 94, 95, 96, 141/128, 192, 198; 73/290 R, 291, 861, 195, 196, 290

[56] References Cited

U.S. PATENT DOCUMENTS

| | | | |
|---|---|---|---|
| 4,423,628 | 1/1984 | Richter | 73/290 R |
| 4,522,237 | 6/1985 | Endo et al. | 141/95 |
| 4,574,849 | 3/1986 | Fukuda | 141/1 |
| 4,598,742 | 7/1986 | Taylor | 141/95 |
| 4,653,322 | 3/1987 | Locante | 73/290 R |
| 4,688,610 | 8/1987 | Campbell | 141/83 |
| 4,787,428 | 11/1988 | Bacroix et al. | 141/198 X |
| 4,807,672 | 2/1989 | Sherk et al. | 141/1 |

Primary Examiner—Ernest G. Cusick
Attorney, Agent, or Firm—Samuelson & Jacob

[57] ABSTRACT

An improvement in apparatus and method for measuring a prescribed volume of liquid by flowing the liquid into a reservoir and sensing the level of the liquid in the reservoir to determine when a known volume is reached places that level within a portion of the reservoir having a much-reduced cross-sectional area compared to the cross-sectional area of the remainder of the reservoir such that any inaccuracy in the sensing of the level to determine when the known volume is reached results in only a minimal deviation in the measured volume of liquid from the prescribed volume of liquid.

10 Claims, 4 Drawing Sheets

INCREASING THE ACCURACY OF LIQUID VOLUME MEASUREMENTS UTILIZING LIQUID LEVEL SENSING

The present invention relates generally to liquid volume measurement and pertains, more specifically, to method and apparatus for increasing the accuracy in measured volumes of liquid where the measurement relies upon sensing the level of the liquid in a reservoir within a vessel.

Liquid level sensors currently are in use in a wide variety of installations where a prescribed volume of liquid desired in a vessel is measured by determining the level of the liquid in the vessel. These liquid level sensors possess a certain degree of inaccuracy, with the result that the level of the liquid sensed by liquid level sensors will deviate somewhat from the point of absolute accuracy, leading to deviations in the measured volume from the desired prescribed volume of liquid. Since the volume of a liquid in a vessel equals the cross-sectional area of the interior of the vessel multiplied by the height of the liquid, any deviation in the actual level of the liquid will result in an error in the volume of the liquid equal to the cross-sectional area multiplied by the amount of the deviation. Improvements in the accuracy of liquid level sensors have enabled reductions in the deviation from the point of absolute accuracy; however, even a small deviation can result in a significant error in the measurement of liquid volume, especially where errors are cumulative, such as in manufacturing processes where even small errors can amount to large differences in volume over longer periods of operation, and in commercial operations where small errors in volumes of liquid dispensed over a long time can add up to large losses.

The present invention takes into account the fact that liquid level sensors possess a degree of inaccuracy and provides for the reduction to a minimum of any errors in measured volume resulting from deviations of a liquid level from the point of absolute accuracy. Thus, the present invention attains several objects and advantages, some of which may be summarized as follows: Reduces to a minimum any error in a measured volume of liquid resulting from deviations in the determination of the level of the liquid being measured; accomplishes a reduction of error in a measured volume of liquid, utilizing any one of a variety of currently available liquid level sensors; provides increased accuracy in the measurement of prescribed volumes of liquid without increasing the time required for accurate measurement; accomplishes increased accuracy in the measurement of prescribed volumes of liquid without a concomitant increase in the complexity of instrumentation and controls; provides simple and effective apparatus and method for increasing accuracy in measuring a prescribed volume of liquid; enables ease and reliability in the accurate measurement of liquid volumes; employs a positive displacement arrangement in a higher speed volumetric method of measurement with increased accuracy and reliability; enables accurate liquid volume measurements for either individual measured volumes or continuous operations; provides liquid volume measurement procedures readily carried out under conditions where protective layers of gases, such as nitrogen, dry air and the like, are necessary, as in the handling of hazardous liquids; provides apparatus and method in which the accuracy of liquid measurement is not affected by changes in pressure or flow rate during filling or discharge, or by any interruption during filling and discharge; enables ready adaptation for use in connection with automated systems in which liquid volume is measured; provides flexibility of design for accommodating a wider variety of specific applications, operating conditions and properties of the liquid being measured; promotes economy in those industries and commercial enterprises which rely upon accurate liquid volume measurement, such as in manufacturing processes and in the dispensing of metered amounts of liquid.

The above objects and advantages, as well as further objects and advantages, are attained by the present invention which may be described briefly as providing, in an apparatus and method for measuring a prescribed volume of liquid by flowing the liquid into a reservoir having a known volume located between a first level and a second level spaced a given distance above the first level, the reservoir further having a first cross-sectional area at the first level and a second cross-sectional area at the second level, and liquid level sensing means for sensing the level of the liquid when the measured volume of liquid fills the known volume in the reservoir and the level of the liquid reaches the second level for determining that the measured volume of liquid is present in the reservoir, the improvement wherein the reservoir includes at least a portion lying between the first level and the second level for containing most of the measured volume of liquid, the portion having a further cross-sectional area, and the second cross-sectional area is substantially smaller than the aforesaid further cross-sectional area of the portion of the reservoir between the first level and the second level so that any slight deviation of the level of the liquid from the second level results in only a minimal deviation in the measured volume of the liquid from the prescribed volume of liquid.

The invention will be understood more fully, while still further objects and advantages will become apparent, in the following detailed description of preferred embodiments of the invention illustrated in the accompanying drawing, in which.

Figure 1:
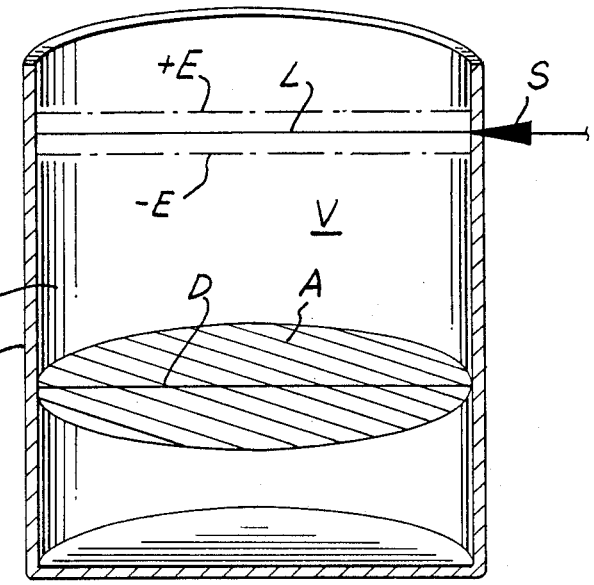
FIG. 1 is a schematic diagram of a conventional liquid volume measuring arrangement.

Referring now to the drawing, and especially to FIG. 1 thereof, a liquid reservoir R is shown schematically within a vessel T having a vertical cylindrical configuration with an internal diameter D providing reservoir R with a cross-sectional area A. A liquid level sensor S senses the level L which provides a prescribed measured volume V in the reservoir R. The sensor S has a "constant error" expressed in terms of a deviation of plus or minus E from the desired level L; that is, within the accuracy of the measurement permitted by sensor S, the level L may fall at any level within the range illustrated by the limits +E and −E. Thus, the maximum error in the measured volume V can be as much as 2 (EA). In a typical installation where diameter D is 72 inches and the constant error E is 0.250 inches, the maximum error in the measured volume may be as much as 8.8 gallons of liquid.

Figure 2:
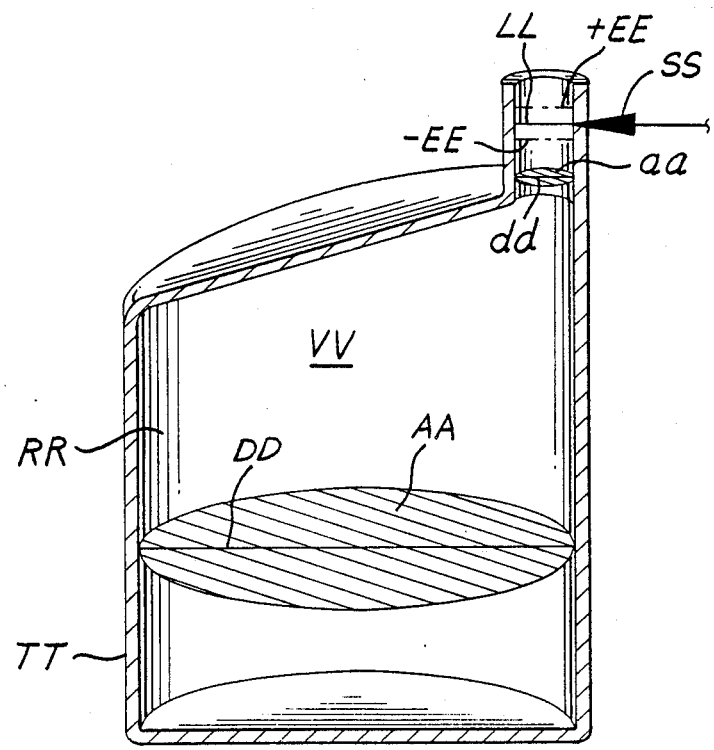
FIG. 2 is a schematic diagram of a liquid volume measuring arrangement of the present invention.

Turning now to FIG. 2, an arrangement constructed in accordance with the present invention employs a reservoir RR within a vessel TT having a largely vertical cylindrical configuration with an internal diameter DD, which is the same as diameter D of vessel T, and provides reservoir RR with a cross-sectional area AA similar to cross-sectional area A. The upper portion of vessel TT differs from the corresponding upper portion of vessel T in that the level LL, at which level the volume VV to be measured within vessel TT is equal to the volume V to be measured in vessel T, falls within a portion of vessel TT having a diameter dd which provides a cross-sectional area aa much smaller than cross-sectional area AA. A liquid level sensor SS senses level LL and has the same constant error as sensor S, so that the level of the liquid to be measured may deviate from level LL within the range illustrated by +EE and −EE. Since the entire range of deviation from level LL lies within the portion of the vessel TT having a cross-sectional area aa, the maximum error in the measured volume VV can be no more than 2(EE)(aa). In a typical installation where diameter DD is 72 inches and diameter dd is 3 inches, a constant error EE of 0.250 inches yields a maximum error in the measured volume of liquid of 0.0152 gallons, representing a considerable reduction in the maximum error in the measured volume of liquid as compared to the arrangement of FIG. 1. It will be apparent that where the accuracy of the sensor SS is increased, so that the constant error is decreased, the error in the measured volume will be reduced to a negligible amount.

Figure 3:
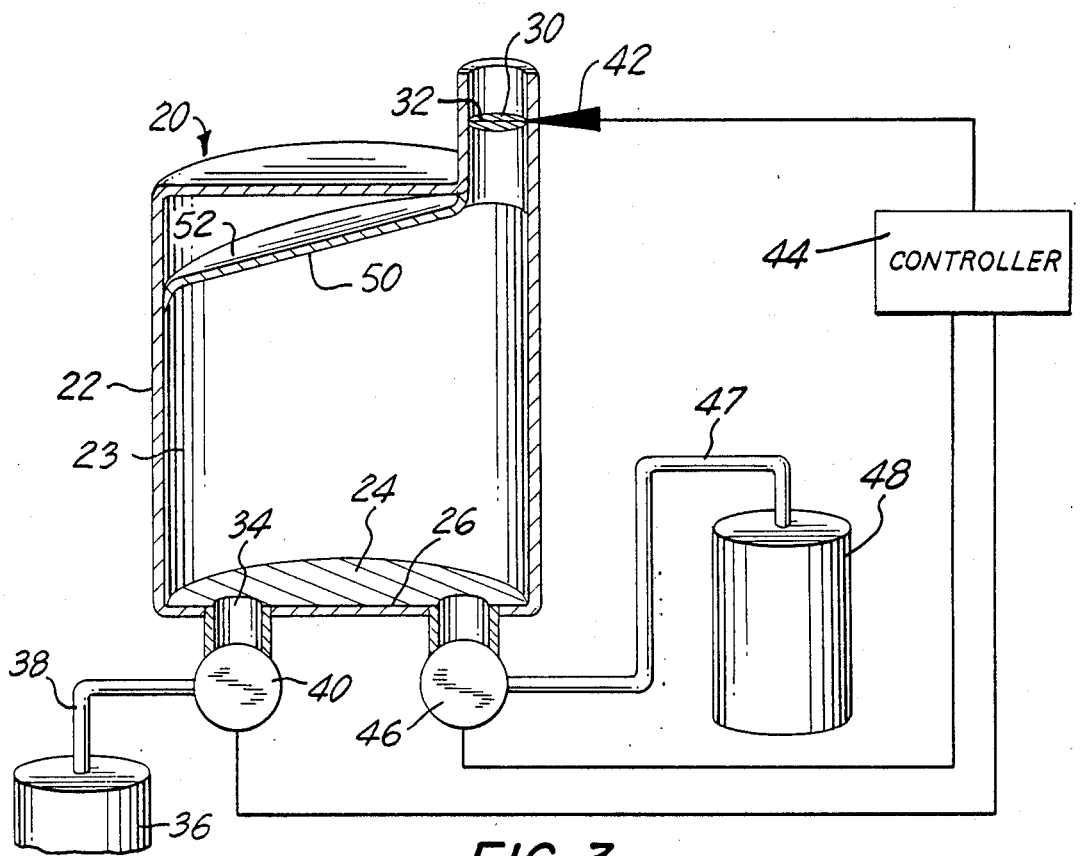
FIG. 3 is a diagrammatic illustration of a liquid volume measuring system constructed in accordance with the invention.
Figure 4:
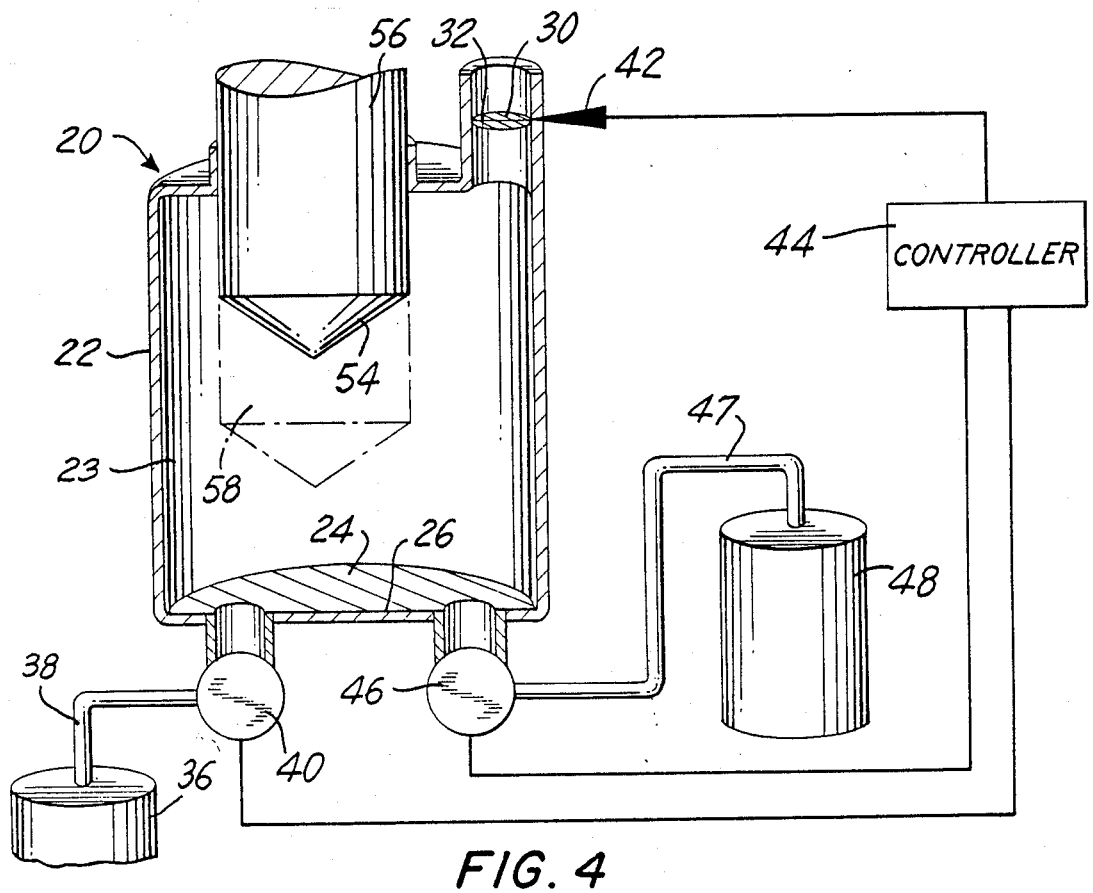
FIG. 4 is a diagrammatic illustration of another liquid volume measuring system constructed in accordance with the invention.

Referring now to FIGS. 3 and 4, a system for dispensing a measured volume of liquid in accordance with the present invention is illustrated at 20 and is seen to include a measuring vessel 22 with a reservoir 23 having a larger cross-sectional area 24 at a lower level 26 and a smaller cross-sectional area 30 at an upper level 32 located above and spaced a prescribed distance from the lower level 26. The volume within the reservoir 23 of vessel 22 between the lower level 26 and the upper level 32 is a known volume which when filled establishes a desired prescribed volume of liquid in the vessel 22. An inlet port 34 communicates with a supply 36 of liquid, through a supply conduit 38 and an inlet valve 40, such that upon opening the inlet valve 40 liquid will enter the reservoir 23 of vessel 22 and the level of the liquid in the vessel 22 will rise. A liquid level sensor 42 is located at the upper level 32 and is connected to a controller 44 so that when the liquid reaches upper level 32, the sensor 42 will signal the controller 44 and the controller 44 will operate to close the inlet valve 40, thereby providing the desired measured volume of liquid in the vessel 22. Once the inlet valve 40 is closed, the controller 44 will operate to open an outlet valve 46 to drain the measured volume of liquid through a conduit 47 to a subsequent point of use, such as into a waiting container 48.

Since the cross-sectional area 24 is relatively large, filling of the reservoir 23 of vessel 22 with the measured volume of liquid can take place relatively rapidly, as can the draining of the measured volume of liquid. Accordingly, the major portion of the known volume provided by the reservoir 23 of vessel 22 is in that portion of the vessel 22 having the larger cross-sectional area 24. The relatively small cross-sectional area 30 at the upper level 32 assures that the measured volume of liquid can deviate only minimally from the desired prescribed volume, as explained above in connection with FIGS. 1 and 2. The transition between the larger cross-sectional area 24 and the smaller cross-sectional area 30, as illustrated at 50, preferably is gradual and smooth so as to avoid abrupt changes in the velocity of the incoming liquid, which abrupt changes can cause deleterious hydraulic effects, such as turbulence, and adversely affect the accuracy of the measurement of the prescribed volume of liquid. In the embodiment of FIG. 3, the transition is accomplished by an angled upper wall 52, which gradually reduces the cross-sectional area from that of cross-sectional area 30 to that of cross-sectional area 24. In the embodiment of FIG. 4, the transition is accomplished by the outer surface 54 of an inserted member 56. Member 56 may be replaced with a like member, as shown in phantom at 58, which extends further into the vessel 22 in order to provide reservoir 23 with a different known volume for the selection of a different measured volume of liquid. Alternately, member 56 may be mounted for selective adjustment of the position of the member 56 within the vessel 22 so as to enable the selection of the known volume provided by the reservoir 23 within the vessel 22.

Figure 5:
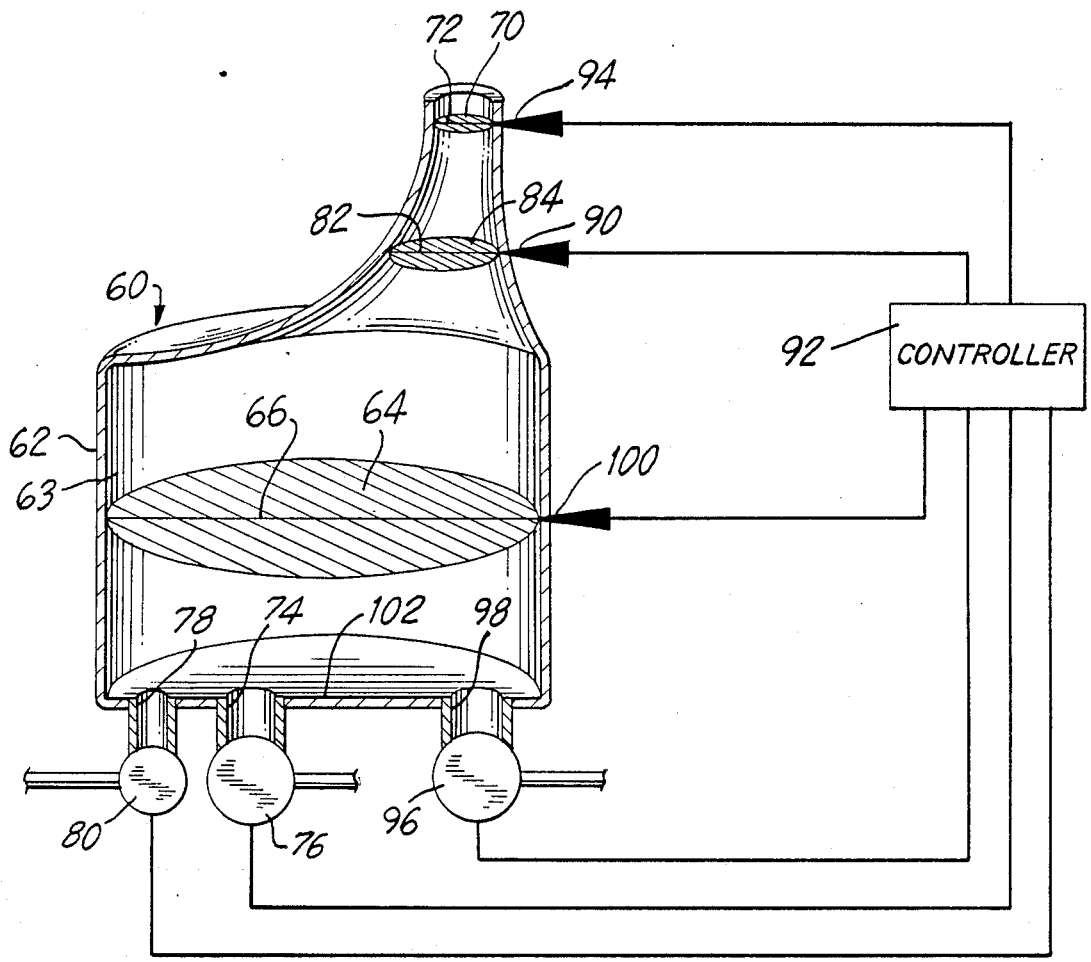
FIG. 5 is a diagrammatic illustration of still another liquid volume measuring system constructed in accordance with the invention.

Turning now to FIG. 5, a system 60 constructed in accordance with the invention includes a vessel 62 containing a reservoir 63 having a larger cross-sectional area 64 at a lower level 66 and a smaller cross-sectional area 70 at an upper level 72 located above the lower level 66. The volume within the reservoir 63 of vessel 62 between the lower level 66 and the upper level 70 is a known volume which when filled establishes a desired prescribed volume of liquid within the vessel 62. A first inlet port 74 communicates with a supply of liquid (not shown), through a first inlet valve 76 and a second inlet port 78 also communicates with the supply through a second inlet valve 80, such that upon opening the inlet valves 76 and 80 liquid will enter the reservoir 63 of vessel 62 and the level of the liquid in the reservoir 63 of vessel 62 will rise toward an intermediate level 82, at which intermediate level 82 the cross-sectional area 84 of the reservoir 63 of vessel 62 is smaller than the cross-sectional area 64 and larger than the cross-sectional area 70. Upon reaching the intermediate level 82, the level of the rising liquid is sensed by a liquid level sensor 90 which is connected to a controller 92 and signals the controller 92 to operate to close the first inlet valve 76. The level of the liquid in the vessel 62 will continue to rise, but at a reduced rate due to the reduced rate of flow into the vessel 62, until the level reaches the upper level 70 where an upper liquid level sensor 94 determines that the measured volume of liquid is in reservoir 63 of the vessel 62 and signals the controller 92 to close the second inlet valve 80. Preferably, first inlet port 74 is larger than second inlet port 78 so that filling is expedited by first filling the larger volume, provided by the cross-sectional area 64, at a higher rate of flow, and accuracy is enhanced by subsequently filling the smaller volume, provided by the smaller cross-sectional area 70, at a lower rate of flow. Finer control and even greater accuracy may be attained by multiplying the number of intermediate levels, and corresponding cross-sectional areas, and the number of corresponding liquid level sensors and flow control devices. Once the second inlet valve 80 is closed, the measured volume of liquid is retained in the reservoir 63. Subsequently, an outlet valve 96 is opened by the controller 92 and the measured volume of liquid is delivered through outlet port 98. When the level of the liquid in the reservoir 63 of vessel 64 drops to the lower level 66, another liquid level sensor 100 signals the controller 92 to close the outlet valve 96 so that only the measured volume of liquid is delivered through outlet port 98. Accuracy is enhanced and time is conserved by spacing the lower level 66 upwardly away from the bottom 102 of the vessel 62, in that delivery of the measured volume of liquid does not require complete emptying of the reservoir 63 of vessel 62.

Figure 6:
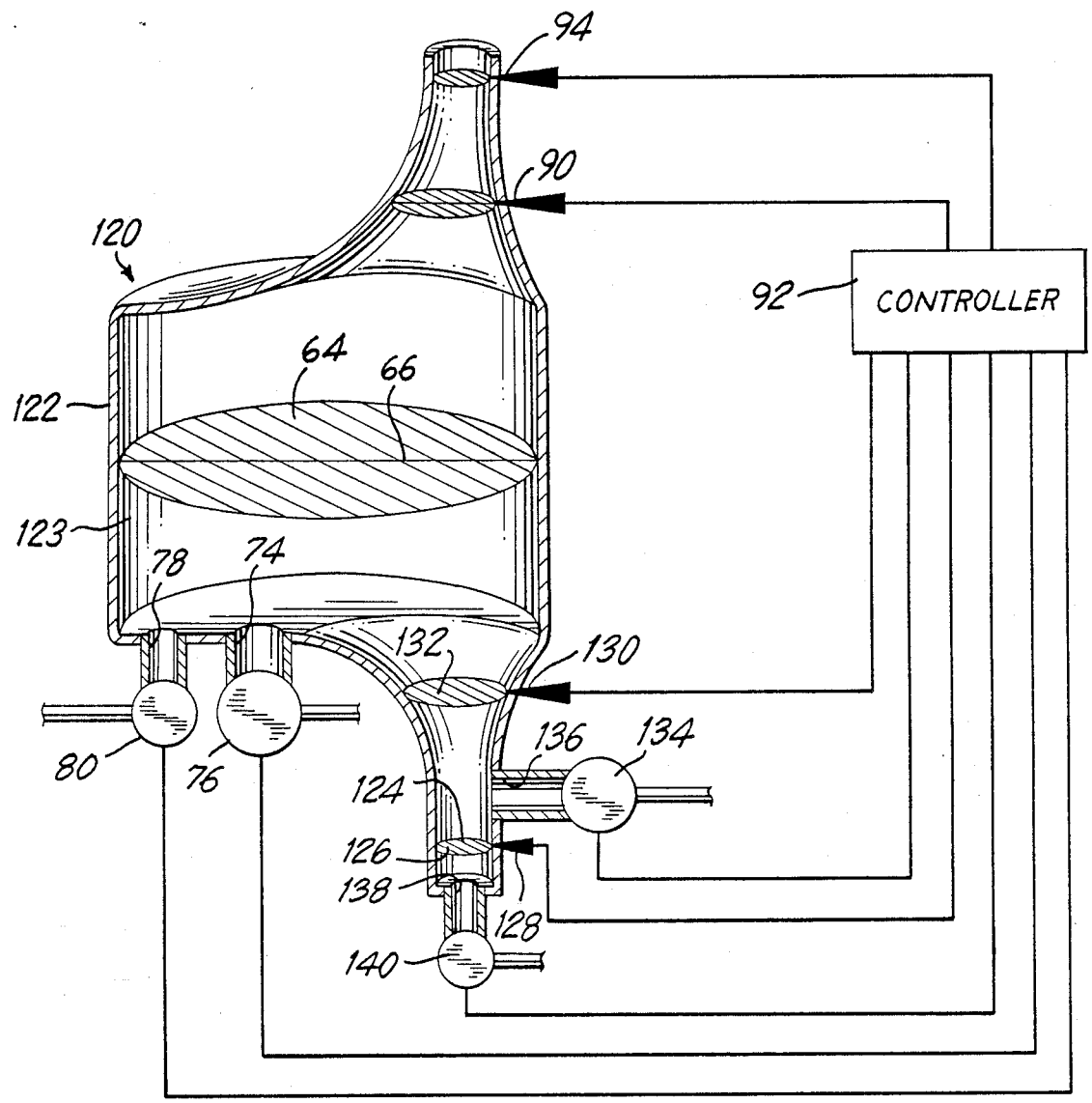
FIG. 6 is a diagrammatic illustration of yet another liquid volume measuring system constructed in accordance with the invention.

In the embodiment of FIG. 6, a system 120 includes a vessel 122 similar in construction to vessel 62 insofar as the system 120 provides for the filling of a reservoir 123 in the vessel 122 with a prescribed measured volume of liquid. Accordingly, the same reference characters are employed to identify the corresponding component parts. However, in the present embodiment, the accuracy of the determination of the lower level 124 is enhanced by placing the lower level 124 within a smaller cross-sectional area 126 of the reservoir 123 of vessel 122 so that any deviation from the nominal level determined by the corresponding sensor 128 will result in a minimal deviation in volume from the prescribed measured volume of liquid. An additional intermediate liquid level sensor 130 is provided at an additional intermediate level 132 and is connected to the controller 92 so that when the level of the liquid drops, during delivery, to intermediate level 132, controller 92 will receive a signal from sensor 130 and will operate to close the outlet valve 134 and corresponding outlet port 136, leaving open only a smaller outlet port 138. When the liquid level reaches the lower level 124, sensor 128 will signal the controller 92 to close the outlet valve 140 and discontinue the flow of liquid from the reservoir 123 of vessel 122. Thus, accuracy is assured during draining, in a manner similar to the attainment of accuracy upon filling.

It will be seen that the present invention reduces to a minimum any error in a measured volume of liquid resulting from deviations in the determination of the level of the liquid being measured; accomplishes a reduction of error in a measured volume of liquid, utilizing any one of a variety of currently available liquid level sensors; provides increased accuracy in the measurement of prescribed volumes of liquid without increasing the time required for accurate measurement; accomplishes increased accuracy in the measurement of prescribed volumes of liquid without a concomitant increase in the complexity of instrumentation and controls; provides simple and effective apparatus and method for increasing accuracy in measuring a prescribed volume of liquid; enables ease and reliability in the accurate measurement of liquid volumes; employs a positive displacement arrangement in a higher speed volumetric method of measurement with increased accuracy and reliability; enables accurate liquid volume measurements for either individual measured volumes or continuous operations; provides liquid volume measurement procedures readily carried out under conditions where protective layers of gases, such as nitrogen, dry air and the like, are necessary, as in the handling of hazardous liquids; provides apparatus and method in which the accuracy of liquid measurement is not affected by changes in pressure or flow rate during filling or discharge, or by any interruption during filling and discharge; enables ready adaptation for use in connection with automated systems in which liquid volume is measured; provides flexibility of design for accommodating a wider variety of specific applications, operating conditions and properties of the liquid being measured; promotes economy in those industries and commercial enterprises which rely upon accurate liquid volume measurement, such as in manufacturing processes and in the dispensing of metered amounts of liquid.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. In an apparatus for measuring a prescribed volume of liquid by flowing the liquid into a reservoir having a known volume located between a first level and a second level spaced a given distance above the first level, the reservoir further having a first cross-sectional area at the first level and a second cross-sectional area at the second level, and liquid level sensing means for sensing the level of the liquid when the measured volume of liquid fills the known volume in the reservoir and the level of the liquid reaches the second level for determining that the measured volume of liquid is present in the reservoir, the improvement wherein the reservoir includes at least one portion lying between the first level and the second level for containing most of the measured volume of liquid, the at least one portion having a further cross-sectional area, and the second cross-sectional area is substantially smaller than said further cross-sectional area of the at least one portion of the reservoir lying between the first level and the second level so that any slight deviation of the level of the liquid from the second level results in only a minimal deviation in the measured volume of the liquid from the prescribed volume of liquid.

2. The improvement of claim 1 including means providing a gradual transition from the further cross-sectional area to the second cross-sectional area.

3. The improvement of claim 1 including an intermediate cross-sectional area between the further cross-sectional area and the second cross-sectional area, the intermediate cross-sectional area being less than the further cross-sectional area and greater than the second cross-sectional area, further liquid level sensing means for sensing the level of the liquid when the liquid level reaches the intermediate cross-sectional area, and control means responsive to the further liquid sensing means for reducing the rate of flow of liquid into the reservoir when the liquid level reaches the intermediate cross-sectional area.

4. The improvement of claim 1 wherein the first cross-sectional area is substantially smaller than the further cross-sectional area, and including second liquid level sensing means for sensing the level of the liquid when the liquid level drops from the second level to the first level so that any slight deviation of the level of the liquid from the first level, as the measured volume of liquid flows from between the first level and the second level, results in only a minimal deviation in the measured volume of the liquid from the prescribed volume of liquid.

5. The improvement of claim 4 including an intermediate cross-sectional area between the further cross-sectional area and the first cross-sectional area, the intermediate cross-sectional area being less than the further cross-sectional area and greater than the first cross-sectional area, further liquid level sensing means for sensing the level of the liquid when the liquid level reaches the intermediate cross-sectional area, and control means responsive to the further liquid level sensing means for reducing the rate of flow of liquid out of the reservoir when the liquid level reaches the intermediate cross-sectional area.

6. The improvement of claim 4 including means providing a gradual transition from the further cross-sectional area to the first cross-sectional area.

7. In the method for measuring a prescribed volume of liquid by flowing the liquid into a reservoir having a known volume located between a first level and a second level spaced a given distance above the first level, the reservoir further having a first cross-sectional area at the first level and a second cross-sectional area at the second level, and sensing the level of the liquid when the measured volume of liquid fills the known volume in the reservoir and the level of the liquid reaches the second level to determine that the measured volume of liquid is present in the reservoir, the improvement wherein the liquid is flowed into at least one portion of the reservoir lying between the first level and the second level for containing most of the measured volume of liquid, the at least one portion having a further cross-sectional area, and continuing to flow the liquid into the reservoir until the level of the liquid reaches the second level and the second cross-sectional area, the second cross-sectional area being substantially smaller than said further cross-sectional area of said at least one portion of the reservoir lying between the first level and the second level so that any slight deviation of the level of the liquid from the second level results in only a minimal deviation in the measured volume of the liquid from the prescribed volume of liquid.

8. The improvement of claim 7 wherein the reservoir includes an intermediate cross-sectional area between the further cross-sectional area and the second cross-sectional area, the intermediate cross-sectional area being less than the further cross-sectional area and greater than the second cross-sectional area, the improvement including sensing the level of the liquid when the liquid level reaches the intermediate cross-sectional area, and reducing the rate of flow of liquid into the reservoir when the liquid level reaches the intermediate cross-sectional area.

9. The improvement of claim 7 wherein the first cross-sectional area is substantially smaller than the further cross-sectional area, the improvement including sensing the level of the liquid when the liquid level drops from the second level to the first level so that any slight deviation of the level of the liquid from the first level, as the measured volume of liquid flows from between the first level and the second level, results in only a minimal deviation in the measured volume of the liquid from the prescribed volume of liquid.

10. The improvement of claim 9 wherein the reservoir includes an intermediate cross-sectional area between the further cross-sectional area and the first cross-sectional area, the intermediate cross-sectional area being less than the further cross-sectional area and greater than the first cross-sectional area, the improvement including sensing the level of the liquid when the liquid level reaches the intermediate cross-sectional area, and reducing the rate of flow of liquid out of the reservoir when the liquid level reaches the intermediate cross-sectional area.

* * * * *